(12) United States Patent  (10) Patent No.: US 7,302,963 B2
Dagn  (45) Date of Patent: Dec. 4, 2007

(54) MOBILE DRAINING STATION FOR MOTOR VEHICLES

(76) Inventor: Josef Dagn, Schwendter Str. 10, A-6345, Kössen (AT)

(*) Notice: Subject to any disclaimer, the term of this patent is extended or adjusted under 35 U.S.C. 154(b) by 70 days.

(21) Appl. No.: 10/520,639

(22) PCT Filed: Jul. 9, 2003

(86) PCT No.: PCT/EP03/07416

§ 371 (c)(1),
(2), (4) Date: Sep. 2, 2005

(87) PCT Pub. No.: WO2004/005634

PCT Pub. Date: Jan. 15, 2004

(65) Prior Publication Data

US 2006/0108001 A1 May 25, 2006

(30) Foreign Application Priority Data

Jul. 9, 2002 (DE) .................................. 20210627

(51) Int. Cl.
 *B60S 3/00* (2006.01)
 *B65D 1/34* (2006.01)
 *E03C 1/00* (2006.01)
(52) U.S. Cl. .................................. 137/234.6; 220/573
(58) Field of Classification Search ............. 137/234.6; 220/573
See application file for complete search history.

(56) References Cited

U.S. PATENT DOCUMENTS

| 3,308,845 | A | * | 3/1967 | Bellas et al. ............. 137/234.6 |
| 4,284,173 | A | * | 8/1981 | Patterson ................. 137/234.6 |
| 5,033,489 | A | * | 7/1991 | Ferre et al. ............... 134/57 R |
| 5,572,759 | A | * | 11/1996 | Zachhuber ............... 137/234.6 |
| 5,833,294 | A | * | 11/1998 | Williams et al. ......... 296/24.32 |
| 6,651,392 | B2 | * | 11/2003 | Ritzal ........................ 52/36.2 |

FOREIGN PATENT DOCUMENTS

| DE | 41 10 419 C | 6/1992 |
| DE | 44 04 882 A | 8/1995 |
| DE | 297 21 907 | 4/1998 |
| WO | WO 01 83328 A | 11/2001 |

\* cited by examiner

*Primary Examiner*—Kevin Lee
(74) *Attorney, Agent, or Firm*—Knobbe Martens Olson & Bear LLP

(57) ABSTRACT

A mobile draining station for motor vehicles is disclosed, comprising a container whose side wall and upper wall can be lifted up and in which carrier arms for receiving a vehicle are arranged in a stationary manner. Pivoting arms for removal devices are pivotably connected to the rear wall of the container and at least one door element is embodied in the rear wall and can be folded downwards in order to extend the base of the container. Collectors are positioned in the container in the region in front of the door element. The collectors can move through the door opening onto the folded-down door element.

9 Claims, 6 Drawing Sheets

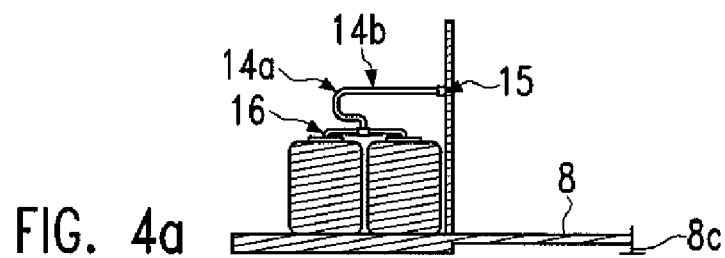
FIG. 4a
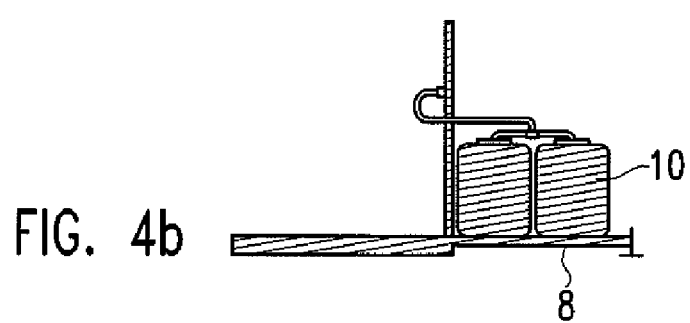
FIG. 4b
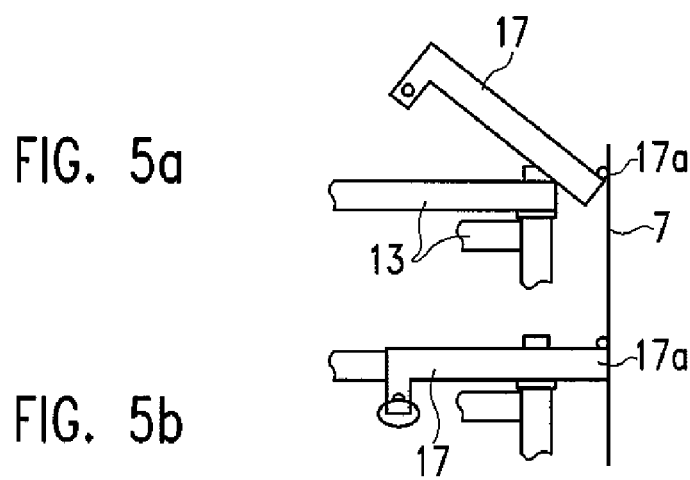
FIG. 5a
FIG. 5b
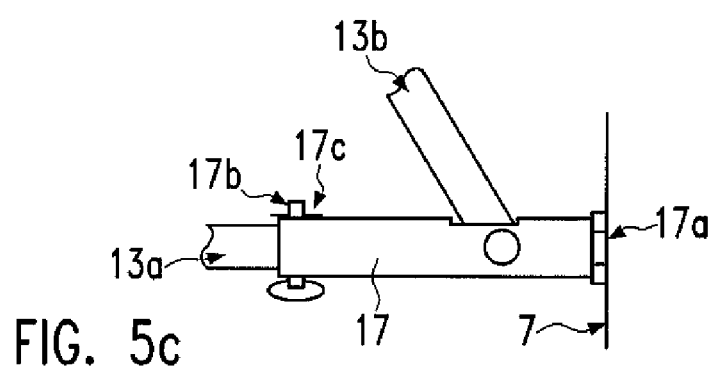
FIG. 5c

MOBILE DRAINING STATION FOR MOTOR VEHICLES

BACKGROUND OF THE INVENTION

Field of the Invention

The invention relates to a mobile draining station for motor vehicles which are to be scrapped or otherwise disposed of.

SUMMARY OF THE INVENTION

It is the object of the invention to provided a draining station which is compact for transporting and provides sufficient working area in the operating mode.

This is solved according to the invention essentially by the features of claim 1. Because wall parts of the container can be lifted up and collectors for the liquids to be removed can be moved out of the container, there results in the operating mode of the mobile draining station a working area undisturbed by collectors.

BRIEF DESCRIPTION OF THE DRAWINGS

An exemplary embodiment of the invention is explained in more detail below with reference to the drawing, in which

FIG. 4 shows two representations of the positioning of the collectors;

FIG. 5 shows a fixing means for the pivoting arms;

DETAILED DESCRIPTION OF THE PREFERRED EMBODIMENT

Figure 1:
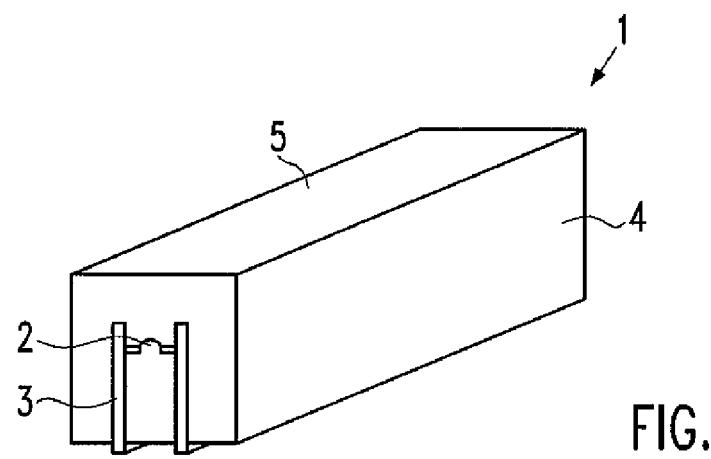
FIG. 1 shows a perspective view of the mobile draining station in the transport state.

FIG. 1 shows a perspective representation of a container 1 having the standard dimensions for a container provided for the transport of goods. On the front end a receiving bracket 2 is provided on a carrier mount 3 so that for transport, the container can be received onto a loading area by means of a crane vehicle or the like.

Figure 2:
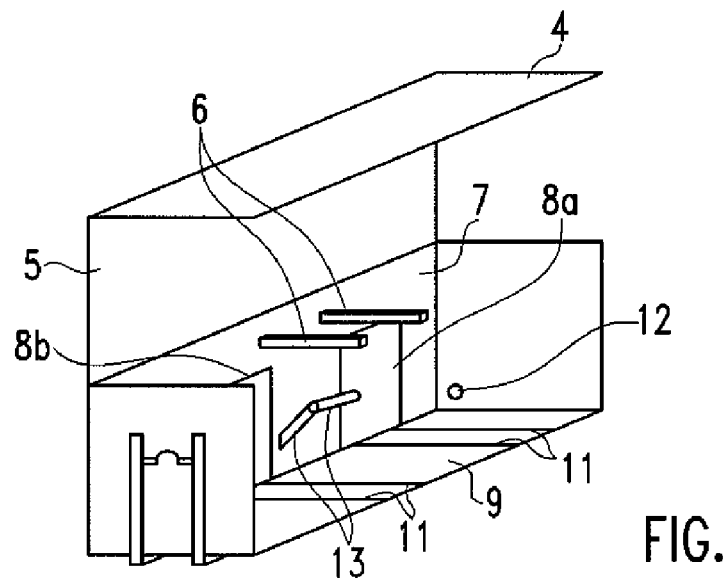
FIG. 2 shows schematically the mobile draining station with the lifted up side wall and upper wall.

In the embodiment shown in FIG. 2, the front side wall 4 of the container can be lifted up together with the upper wall 5, so that the side wall 4 forms a roof area. In the container 1, two carrier arms 6 for the vehicle to be drained are arranged in a stationary manner approximately in the middle of the rear wall 7. In FIG. 2 these carrier arms 6 are only indicated schematically. In the operating mode according to FIG. 2, a vehicle for draining is set down on the carrier arms 6 by means of a forklift truck or a corresponding lifting means, and removed again after draining.

According to another embodiment, the upper wall 5 is lifted slightly by means of a crank equipped with a safety spring, whereupon a roof extension consisting of three parts is folded outwards and fixed. Hereby, stiffening elements can be provided, such as an inclined strut between the roof area and the rear wall.

Figure 3:
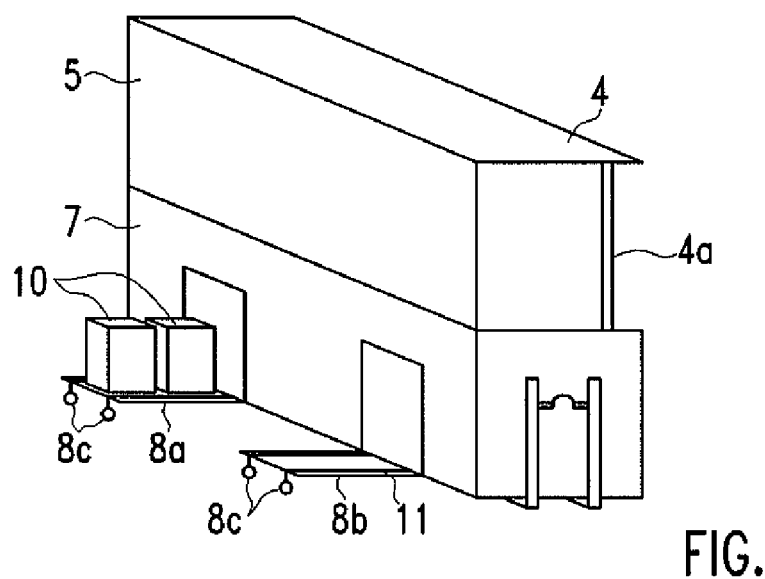
FIG. 3 shows schematically a rear view of the folded-out door elements in the rear wall of the container.

In such an embodiment, instead of a crank having a safety spring, a hydraulic cylinder can also be provided on both sides of the container for lifting the roof. In FIG. 3, a safety rod 4a is arranged between the roof and the container base for supporting the roof. Such a safety rod can be omitted if actuation is by hydraulic cylinders.

On both sides of the carrier arms 6, in the rear wall 7 door elements 8a and 8b are formed which can be folded out downwards by means of a hinge along the base wall 9, as shown in FIG. 3. In the transport position according to FIG. 1, in front of the door elements 8a and 8b there are positioned in the container 1 large-volume collectors 10 which, in the operating position according to FIGS. 2 and 3, are moved towards the folded-away door elements 8a and 8b as shown schematically in FIG. 3, so that the working area in the container is cleared. To allow a large number of vehicles to be drained by the mobile draining station, large-volume collectors 10 are provided which have a corresponding capacity if the different liquids from a large number of motor vehicles are to be received. In the embodiment shown, four collectors 10 for petrol, diesel, used oil and coolant are provided, wherein the individual containers can also have a different capacity.

The collectors 10 can be moved onto the base 9 of the container 1 on rails 11 as shown schematically in FIG. 2. This rails 11 are also provided on the door elements 8a and 8b, as shown schematically in FIG. 3, so that the collectors 10 can be moved onto the folded-down door elements.

The door elements 8 are coupled to the base wall of the container such that in the opened state they are aligned with the base wall 9 of the container. On the outer ends of the door elements, means for height adjustment are mounted so that on uneven ground the folded-out door elements can be fixed in a horizontal position. Exemplarily, spindles 8c having a support plate can be provided on the door elements and adjusted by torsion to the corresponding height, wherein they are supported on the base by means of the support plates.

FIG. 4a shows two of the collectors 10 in the position inside the container with the folded-down door element 8. FIG. 4b shows the collector 10 displaced outwards onto the folded-down door element. Filling pipes 14 and hoses for an overflow safety device are flexibly mounted on the collectors 10 and laid such that they make it possible to displace the collectors without dismounting the pipes. Two pipe angles of a wall fastening 15 are directed into the inside of the container. The pipes 14a and 14b (in FIG. 4 the second pipe is covered by the first one in each case) are designed as flexible rubber hoses. A connection angle piece of rigid pipes 16, which preferably consist of galvanized steel tubes, are also directed into the inside. The pipe angles of the wall fastening 15 are arranged higher than the angles pieces of the rigid pipes 16 on the collectors to allow unhindered displacing thereof.

The plant is equipped with a pneumatic overflow safety device for monitoring the collectors. These overflow safety devices each have an optical and an acoustic display, which is not shown in detail.

Between the collectors 10 and the rails 11, a safety device is provided for each position of the collectors. Preferably, a laterally flattened shaft is provided for this, which is carried in the base wall 9 of the container and rotatable by 90°.

Further, in the container 1 several removal devices are provided which are explained in detail below. The power supply for these removal devices, such as pumps and suction means, is provided by means of a compressed-air connection 12 mounted on the container 1, to which an external compressor can be connected. From the central compressed-air connection 12 indicated schematically in FIG. 2, pipes (not shown) lead to the individual removal devices for operating thereof.

In the whole working area, special grates are provided on the base 9 of the container.

Instead of an external power supply which can also be designed as an electric power supply, a drive aggregate such as a compressor or an electricity-generating device can also be provided inside the container 1 and is transported to the service locations together with the container 1. Preferably, in such a case the power supply aggregate at the container can also be moved out, corresponding to the collectors 10 which can be moved out, so that the working area in the container 1 is not blocked.

Under the carrier arms 6, pivoting arms 13 for funnels and similar removal devices are pivotably mounted on the rear wall 7 of the container or on a column. Manually operated removal devices such as brake hose nippers are preferably also mounted on the rear wall 7 of the container with corresponding hose connections so that they can be taken down, allowing the operator to work under the vehicle which is supported on the carrier arms 6.

To fix the pivoting arms 13 during transport, a fixing rail, shown in FIG. 5, can be pivotably coupled to the rear wall of the container. FIG. 5a shows a side view of the fixing rail 17 coupled by means of a hinge 17a to the rear wall 7 of the container in the open state, while FIG. 5b shows a side view of the fixing rail 17 in the closed state. FIG. 5c shows a front view of the closed fixing rail 17 which is fixed on the one pivoting arm 13a by means of a locking pin 17b having a split-pin 17c and by means of a lateral opening overlaps the other pivoting arm 13b so that this is also fixed in position during transport.

According to another embodiment, the pivoting arms 13a and 13b can be fixed by means of a clamping device to a linkage of bars which during transport is anchored to the collectors 10, for example to their dome covers.

Figure 6:
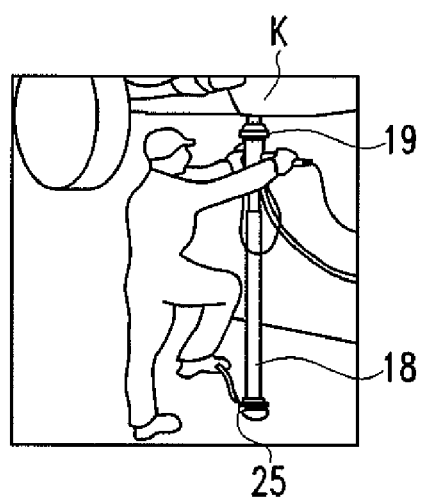
FIG. 6 shows a schematic view of the positioning of a tank boring device.
Figure 7:
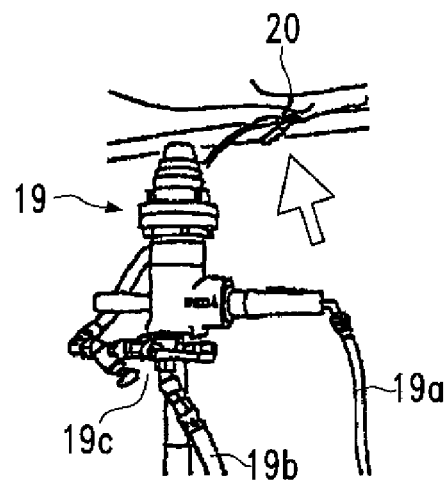
FIG. 7 shows in detail the boring device according to FIG. 6.
Figure 8:
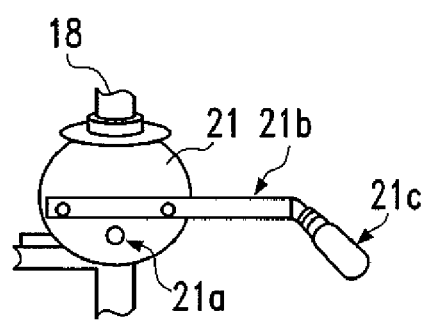
FIG. 8 shows a device for adjusting the height of the boring device.

A tank boring device is provided in the container for allowing the removal of fuel from the tank of a vehicle if this should not be possible or expedient by using a tank suction hose. FIG. 6 shows mounted on a support 18 a boring apparatus 19 which is displaced upwards by actuating a foot pedal 25, wherein simultaneously a lever for a compressed-air motor mounted on the boring apparatus can be actuated. In FIG. 6, K indicates a motor vehicle. FIG. 7 shows a view of the boring apparatus 19 having a connection pipe 19a for the compressed-air motor. A vacuum pipe 19b is connected to a valve 19c which can be opened after boring the tank so that the fuel can be drawn off via the suction pipe 19b.

In FIG. 7, a compensator 20 for an electric potential is connected to a conducting part of the motor vehicle before drawing-off, and is removed again after drawing-off. After drawing-off of the fuel, the opening drilled into the tank is closed by a plug.

The tank boring device 19 is placed under the tank of the vehicle by a pivoting arm 13. At the lower end of the column 18 for the boring device 19, an eccentric disc 21 having a rotation axis 21a is mounted which can be rotated using a lever 21b having a hand knob 21c such that the whole device can be lifted from the base or lowered onto it. Supporting this eccentric disc 21 on the base results in good stability during boring upwards into the tank. By releasing the eccentric lever 21b, the upper part of the boring device is lifted, preferably supported by a gas pressure spring (not shown), up to the base of the vehicle tank.

Figure 9:
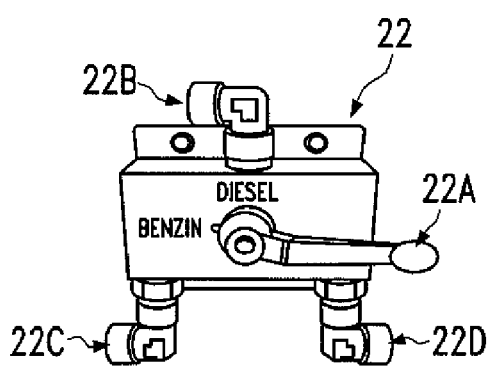
FIG. 9 shows a control valve for drawing off fuel.

FIG. 9 shows a fuel control valve 22 connected to the suction pipe 19b of the boring device and allowing to separate petrol and diesel. A hand lever 22a actuates a three-way valve mounted in the housing of the control valve 22 so that the fuel is fed from an inlet 22b to which the suction hose 19b is joined, according to the position of the lever to the outlet 22c or 22d leading to a petrol pump or diesel pump (not shown) through which the fuel is pumped into the respective collectors 10.

Figure 10:
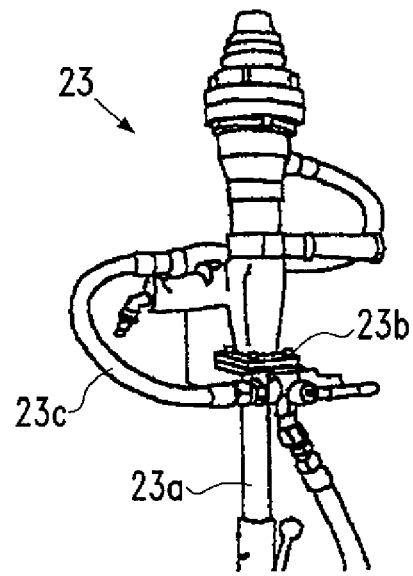
FIG. 10 shows a gear boring device.

FIG. 10 shows a gear housing boring device 23 which is used for speed-changing gears and differential gears with no drain plugs. This gear housing boring device 23 has a drill having a special ground section and a correspondingly strong compressed air motor for drive. This gear housing boring device 23 is provided moveably on a support 23a in the container 1. Height adjustment takes place by means of a gas pressure spring (not shown).

Figure 11:
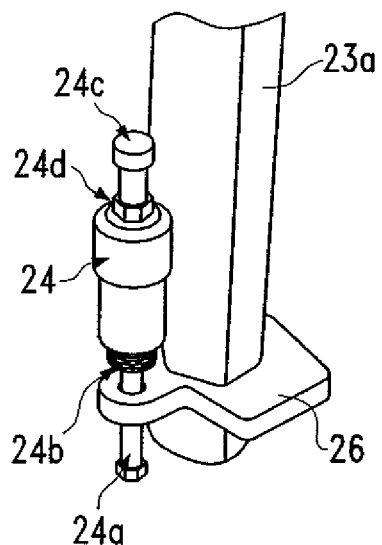
FIG. 11 shows a height adjustment device for the boring device.

To prevent the penetrating of the wall of the gear housing such that the hardened toothed wheels of the gear are hit, the bore depth of the gear boring device 23 is limited. For this, on the lower end of the column 23a a hand spindle 24 (FIG. 12) is attached, in which an inner thread is provided. With this hand spindle 24 the moving distance of a foot pedal 25 (FIG. 12) can be adjusted to the required bore depth. In FIG. 11, an adjusting rod 24a has an outer thread 24b. This adjusting rod 24a is rigidly mounted on a base plate (not shown) of the gear boring device. An adjusting screw 24c has a counternut 24d with which the minimum bore depth is set.

Figure 12:
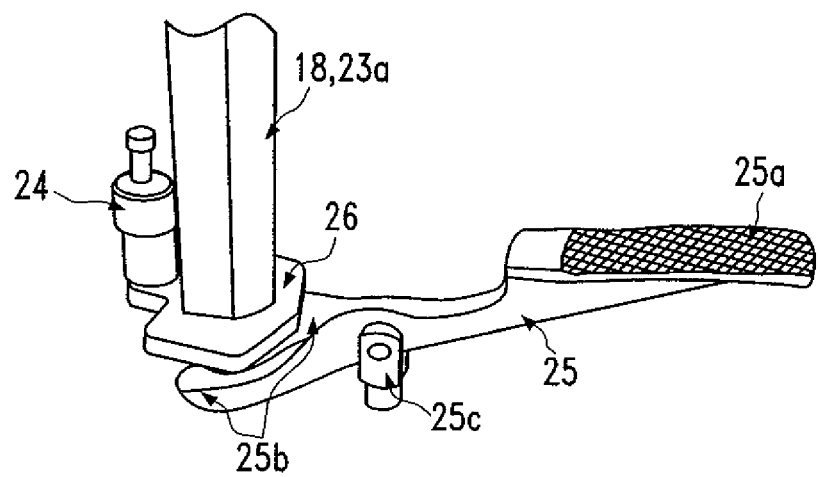
FIG. 12 shows a foot pedal for actuating the boring device.

Using the foot pedal 25 shown in FIG. 12, the boring device is displaced upwards along the whole bore distance. This applies to the tank boring device 19 and the gear boring device 23. By pressure on a tread 25a, a pressure plate 26 of a fork 25b of the foot pedal is displaced upwards. The foot pedal is supported on a rocker joint 25c. The rocker joint 25c is screwed to the base plate of the boring device or to a base foot in the case of a pivoting arm design. The pressure plate 26 is rigidly joined to the slide rod or the support 18 or 23a of the boring device.

Figure 13:
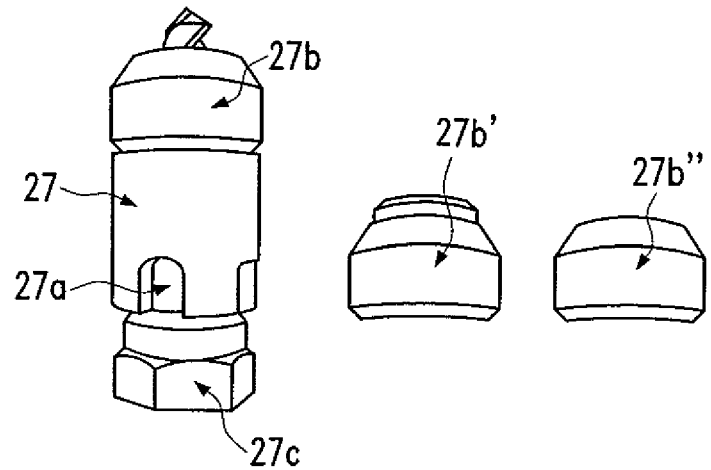
FIG. 13 shows bore attachments for height adjustment.

For varying the bore depth, instead of the hand spindle 24 another attachment can be provided on the boring device. FIG. 13 shows a basic attachment 27 having a horizontal groove 27a throughout which allows the unhindered escape of resulting bore chips. Distance attachments 27b'-27b" have different heights and are used according to different gear housing walls. For example, the distance attachment 27b" is used for cast iron material, attachment 27b' for aluminium, and attachment 27b for sheet steel. The bore chuck is designated by 27c.

During removal of the fuel from the tank, a plurality of sieve devices removes a considerable number of dirt particles from the fuel while it is still in the tank boring device 19, wherein the subsequent filtering of petrol and diesel in front of the pump opening takes place separately.

Figure 14:
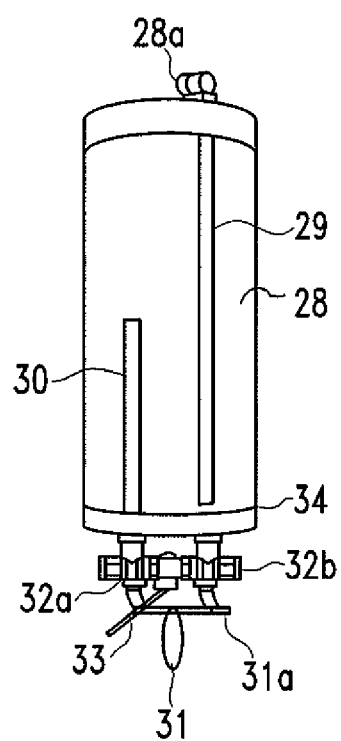
FIG. 14 shows a device for quality assurance.
Figure 14A:
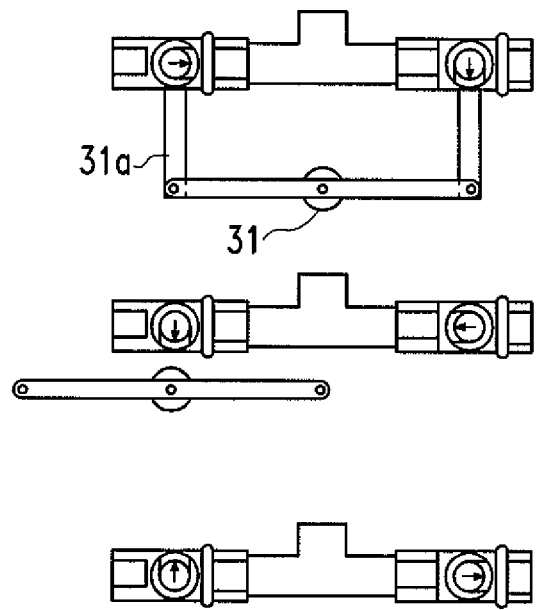

Further, in the container 1 there is quality control for recognizing and separating clean petrol and impure substances. FIG. 14 shows mounted in the container 1 a glass cylinder 28 in which a filling tube 29 is arranged such that it just ends at the base of the glass cylinder to avoid foaming of the liquid. The filling tube 29 is joined at 28a to the delivery side of a pump (not shown). A control amount tube 30 determines by its height the amount of medium to be checked. If the position of a lever 31 is disregarded, the quality control is designed such that the overflow amount is fed directly into the collector for impure substances. The lever 31 is joined by a linkage of bars 31a to two valves 32a and 32b. The outlet for impure substances is designated by 33. FIG. 14a shows the different positions of the lever 31. In the upper middle position, impure fuel is fed to the drain 33. By displacing the lever or the two valves, the fuel can be let off either through the outlet 32b for clean petrol or through the outlet 33. By this process, simultaneously an opening 34 for emptying of residue is opened, which is located directly on the base of the cylinder 28 for quality control. In the petrol pump pipe to the collector 10 there is a built-in flame guard filter for excluding the possibility of an explosion.

Figure 15:
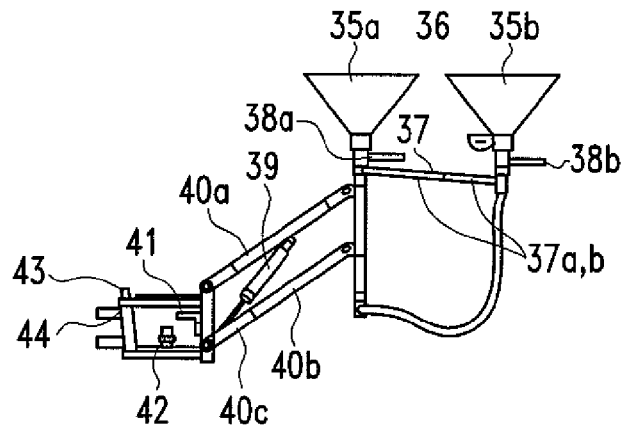
FIG. 15 shows funnels for receiving used oil.

To remove used oil after opening the drain plug on the oil pan of a vehicle, the funnels 35a and 35b are provided in FIG. 15 for catching used oil from the gear and engine. A holder 36 is provided on one of the funnels for storing the drain plugs. The distance between the two funnels can be adjusted, after opening a locking screw 37, by displacing the bars 37a and b such that optimum positioning of the funnels under the drain plugs of gear and engine is guaranteed. By actuating the levers of valves 38a and 38b, the path to the pump is opened or closed. A pneumatic lifting means 39 between two guide rods 40a and 40b of a linkage of bars carrying the funnels allows vertical displacement of the funnels so that these can be placed directly at the gear or the engine, to achieve a short dropping height of the used oil. The guide rods 40 form a parallelogram so that during lifting and lowering, a parallel course of the guide rods takes place. A rocking lever 41 and a compressed air limiter 42 actuate the compressed air cylinder 39. The lower guide rod 40b has a forked bend at 40c, which does not hinder the movement of the compressed air cylinder 39. The linkage of bars is designed such that the horizontal movement is guided by means of two joints when the funnels are positioned in the required position. A prestressed cap 43 and a friction disk 44 at one of the joints have the function of a brake so that the set position of the funnels is maintained. By tightening the prestressed cap 43, increased pinching of the friction disk 44 is achieved for increasing the braking effect.

On the gear housing boring device 23, one side of the threeway valve 23b, an additional suction pipe 23c is connected, by means of which hydraulic fluid can be drawn off.

Figure 16:
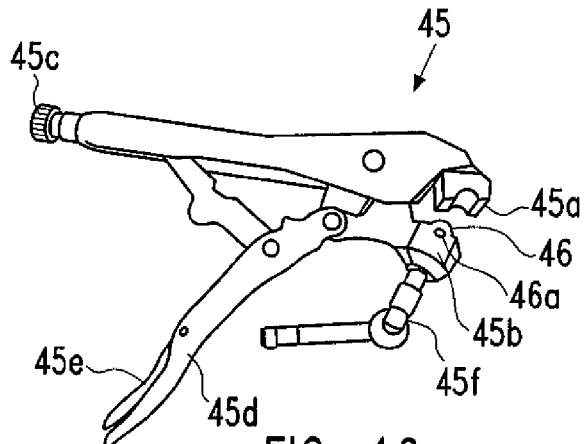
FIG. 16 shows a pair of brake hose nippers.
Figure 16A:
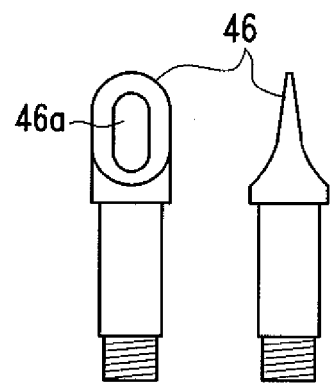

For drawing off brake fluid, in the container 1 a brake hose nipper 45 is provided as shown in FIG. 16. The clamping jaws 45a and 45b are formed such that they can receive all conventional hose sizes. On the lower clamping jaw 45b a cutter 46 is provided, in which a bore 46a is formed for drawing off brake fluid from the brake hose. A tight fit of the nippers can be achieved by means of an adjusting screw 45c. The nippers are closed by pressing their tension lever 45d, wherein the cutter 46 cuts open the brake hose. The nippers can be reopened by means of a release lever 45e. On the lower clamping jaw 45b a connecting nipple 45f is provided, to which a suction hose is joined. FIG. 16a shows in detail the cutter 46 in two views rotated by 90°.

Figure 17:
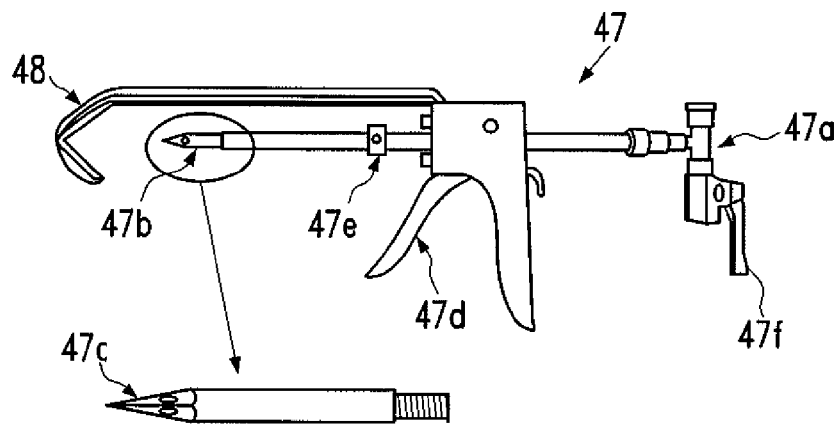
FIG. 17 shows a suction pistol.

FIG. 17 shows a suction pistol 47 which allows the removal of oil from the power steering and the automatic gears without cutting the hoses. On the suction pistol 47, a bracket 48 is mounted for surrounding the hose. After surrounding the hose, a lance 47a is displaced forwards whose tip 47b is placed on the hose. The tip 47b can be formed as a triangle so that it can also be used for hoses with steel fabric. At the tip there are openings 47c for drawing off the liquid. For the forward displacement of the lance 47a, a conventional forward feed pistol having an actuating lever 47d is used. The forward displacement path is limited such that the bore comes to abut on the lance tip inside the hose walls. An adjusting screw 47e is provided for adjusting the length of the lance. Joined to the lance there is a hose 47f through which the drawn-off liquid is let off.

In the container 1, pumps (not shown in detail) are provided for the drawing-off processes. Further, in the container a shock absorber boring device is installed preferably on the rear wall 7. For brake fluid, provided stationarily in the container there is a vacuum tank which has a smaller volume than the collectors 10 and can thus be arranged in a stationary manner in the container. The same applies for a vacuum tank for windscreen anti-freezing agent.

The invention claimed is:

1. Mobile draining station for motor vehicles, comprising
a container whose side wall and upper wall can be lifted up and in which carrier arms for receiving a vehicle are arranged in a stationary manner;
a pivoting arm for removal devices pivotably connected to the rear wall of the container; and
at least one door element provided in the rear wall which can be folded out downwards in order to extend the base of the container,
wherein collectors are positioned in the container in the region in front of the door element and can move through the door opening onto the outwardly folded door element.

2. Mobile draining station according to claim 1, wherein on the inside of the door elements rails are mounted which are continued on the base of the container.

3. Mobile draining station according to claim 1, wherein at the outer ends of the door elements adjustable supporting elements are provided.

4. Mobile draining station according to claim 1, wherein for the pivoting arm a fixing means is provided to fix the pivoting arm in position during transport.

5. Mobile draining station according to claim 1, wherein the container contains at least one removal device.

6. Mobile draining station according to claim 2, wherein at the outer end of the door element adjustable supporting elements are provided.

7. Mobile draining station according to claim 2, wherein for the pivoting arm a fixing means is provided to fix the pivoting arm in position during transport.

8. Mobile draining station according to claim 3, wherein for the pivoting arm a fixing means is provided to fix the pivoting arm in position during transport.

9. Mobile draining station according to claim 4, wherein for the pivoting arm a fixing means is provided to fix the pivoting arm in position during transport.

* * * * *